Dec. 23, 1952    C. D. SCHROEDER    2,622,922
GLARE SHIELD
Filed Feb. 27, 1950
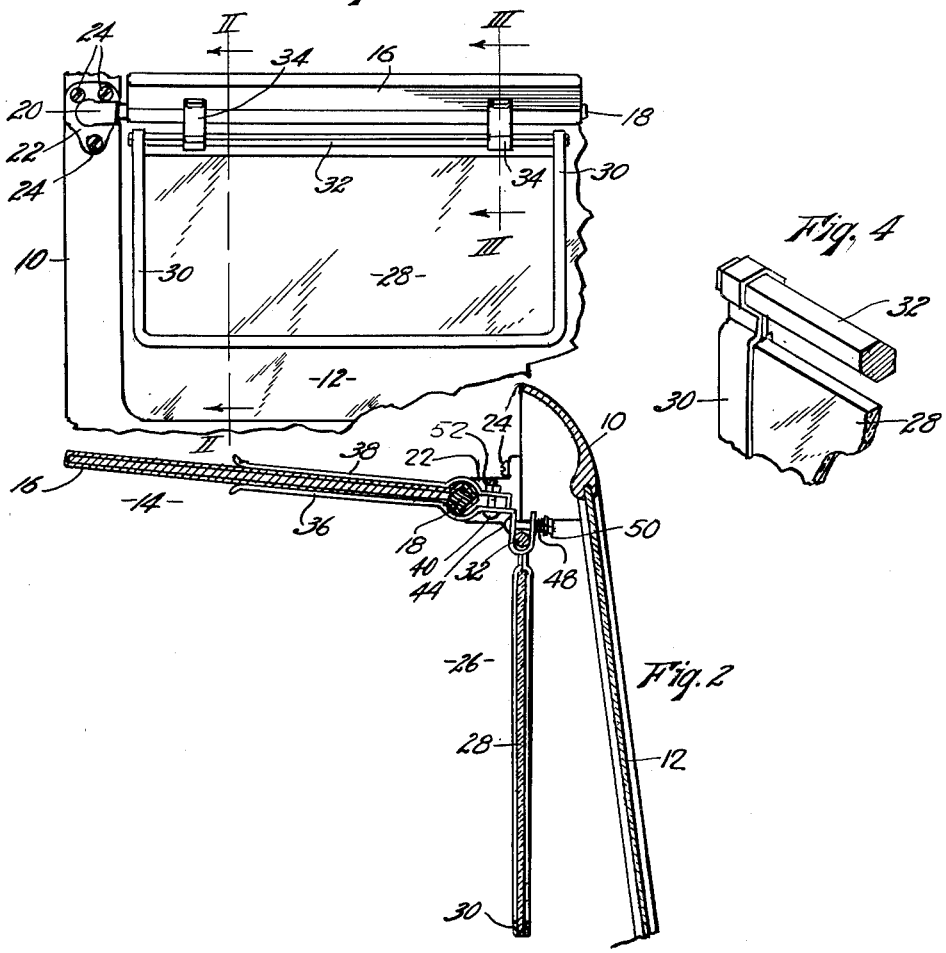
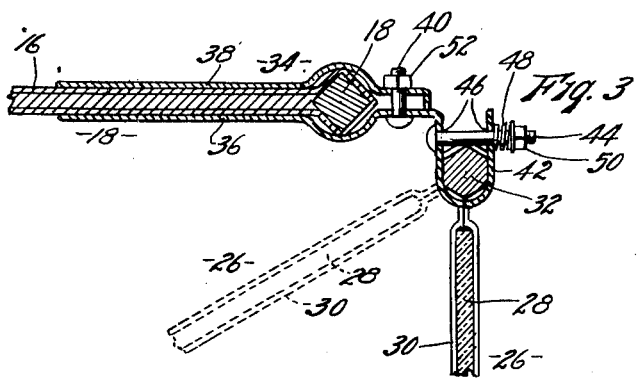
INVENTOR,
Charles D. Schroeder
BY
Hamilton & Hamilton,
Attorneys.

Patented Dec. 23, 1952

2,622,922

UNITED STATES PATENT OFFICE 2,622,922

GLARE SHIELD

Charles D. Schroeder, Kansas City, Kans.

Application February 27, 1950, Serial No. 146,417

1 Claim. (Cl. 296—97)

This invention relates to improvements in a glare and light shield suitable for use with the conventional automobile visor and constructed for convenient placement on and removal from the visor and adapted to be adjusted to various positions relative to the visor.

The principal object of the present invention is the provision of auxiliary glare and light shield comprising a sheet of transparent material mounted in a frame and provided with a hexagonal bar carried by said frame in spaced relation above the upper edge of said sheet, and gripping means carried by the windshield visor and having gripping means to engage said hexagonal bar and hold said sheet in a predetermined angle to said visor.

Other objects are simplicity and economy of construction, ease and efficiency of operation and adaptability for use with the various types of visors.

With these objects in view as well as other objects which will appear during the course of the specification reference will be had to the drawing wherein:

Figure 1 is an elevational view of a glare and light shield mounted on a visor and embodying this invention.

Figure 2 is an enlarged sectional view taken on line II—II of Fig. 1.

Figure 3 is an enlarged sectional view taken on line III—III of Fig. 1.

Figure 4 is a fragmentary perspective view of the glare and light shield.

Throughout the various views of the drawings like reference numerals refer to similar parts and the numeral 10 designates an automobile having a windshield 12 which is provided with a conventional visor 14. This visor comprises a substantially planar plate 16 mounted at its side on a bar 18 which in turn is adjustably carried by bearing 20 associated with a bearing bracket 22 secured to the automobile structure 10 by means of screws 24. The visor is opaque and may be adjusted to the various positions to suit the convenience of the driver under ordinary conditions but will not serve to protect the driver against the glare of approaching automobile lights in night driving; further, during morning and evening driving, the direct sun rays cannot be avoided by this ordinary visor. To obviate these shortcomings an auxiliary glare or light shield device 26 including a sheet 28 of suitable colored transparent material such as glass, Celluloid, etc. of a suitable size. This sheet 28 is mounted at its bottom and end edges in a metallic channel shaped frame 30, which extends upwardly therefrom to clampingly engage the opposite ends of a hexagonal bar 32 which is parallel with and spaced apart from the upper edge of sheet 28.

Two like gripping members 34 each comprising two elongated strap members 36 and 38, are so formed and joined together by bolt 40 as to clampingly engage the sheet 16. It will be noted that strap member 36 is formed as a trough at its outer end at 42 to receive the hexagonal bar 32 therein. This member 36 is made of a resilient material and trough 42 is joined together at its upper extremities by a bolt 44 which extends through holes 46 and projects outwardly therebeyond to receive a spring 48 which is adjustably forced against the outer arm of trough 42 by a nut 50 operatively positioned on bolt 44. This trough serves to grip the hexagonal bar 32 to secure the member 28 in any desired angled relation to the visor. When the glare and light shield 26 is in use usually the visor 14 is in the raised position as shown, out of the line of vision of the driver. The mounting of the visor is such that it will retain its position to maintain the gripping members 34 in a fixed position against moving as the glare shield 26 is forced to its desired position in trough 42, where it will be secured in operative position.

Strap 38 of gripping member 34 is formed to fit over the top side of the visor and to be clampingly secured to strap member 36 by bolt 40, the nut 52 of which may be set to force the straps 36 and 38 tightly against the visor plate 16.

The sheet 28 is preferably made of a tinted or colored transparent sheet that is best suited to absorb or eliminate the glare and objectional rays of light normally encountered in driving an automobile in the daytime or at night.

What I claim as new and desire to protect by Letters Patent is:

For use in connection with a conventional automobile windshield visor hinged along one edge to said automobile, a glare and light shield comprising a sheet of transparent material, a polygonal bar carried by said sheet in parallel spaced relation from one edge thereof, gripping members each comprising a pair of pivotally related resilient arms adapted to be disposed respectively on opposite sides of said visor at the free edge thereof, means for drawing said arms together to clamp said visor therebetween, one of the arms of each of said gripping members being extended outwardly from the edge of said visor and forming a trough parallel to the hinged edge of said visor, said troughs being adapted to receive said polygonal bar therein, a bolt extending across the open side of each of said troughs to retain said bar therein, and adjustable spring means on said bolt for urging the walls of said trough together to resist rotation of said bar therein.

CHARLES D. SCHROEDER.

REFERENCES CITED

The following references are of record in the file of this patent:

UNITED STATES PATENTS

| Number | Name | Date |
|---|---|---|
| 1,633,190 | Rader | June 21, 1927 |
| 1,940,540 | Gagnier et al. | Dec. 19, 1933 |
| 2,112,726 | Kemp et al. | Mar. 29, 1938 |
| 2,294,317 | Pelcher et al. | Aug. 25, 1942 |
| 2,458,125 | Winkler | Jan. 4, 1949 |